United States Patent
Mano

(10) Patent No.: US 10,591,858 B2
(45) Date of Patent: Mar. 17, 2020

(54) VOLTAGE GENERATION DEVICE, POWER CONTROL DEVICE, IMAGE FORMING APPARATUS, AND CONTROL METHOD

(71) Applicant: Tsuyoshi Mano, Tokyo (JP)

(72) Inventor: Tsuyoshi Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/416,682

(22) Filed: May 20, 2019

(65) Prior Publication Data
US 2019/0369536 A1  Dec. 5, 2019

(30) Foreign Application Priority Data
May 31, 2018  (JP) .................................. 2018-105151

(51) Int. Cl.
*G03G 15/00* (2006.01)
*H02M 7/537* (2006.01)
*G03G 15/02* (2006.01)

(52) U.S. Cl.
CPC ....... *G03G 15/5004* (2013.01); *G03G 15/025* (2013.01); *G03G 15/80* (2013.01); *H02M 7/537* (2013.01)

(58) Field of Classification Search
CPC .. G03G 15/5004; G03G 15/025; G03G 15/80; H02M 7/537
See application file for complete search history.

(56) References Cited

U.S. PATENT DOCUMENTS

| 2014/0248064 A1* | 9/2014 | Tanaka ............... G03G 15/1675 399/66 |
| 2015/0093137 A1 | 4/2015 | Minami |
| 2018/0367021 A1 | 12/2018 | Mano |

FOREIGN PATENT DOCUMENTS

| JP | 2004-102079 | 4/2004 |
| JP | 2015-092219 | 5/2015 |
| JP | 2015-122881 | 7/2015 |

* cited by examiner

*Primary Examiner* — G. M. A Hyder
(74) *Attorney, Agent, or Firm* — IPUSA PLLC

(57) ABSTRACT

There is provided a voltage generation device for generating a voltage in which an alternating-current voltage is superimposed on a direct-current voltage, to apply the voltage to a rotary body. The voltage generation device includes a direct-current power supply, an alternating-current power supply, a variation phase determiner, and a voltage controller. The alternating-current power supply is connected to the direct-current power supply. The variation phase determiner is configured to determine whether variation of an output voltage of the alternating-current power supply and variation of an output current of the alternating-current power supply are in opposite phases. The voltage controller is configured to perform gain correction for the output voltage in a case where the variation of the output voltage and the variation of the output current are in opposite phases.

12 Claims, 17 Drawing Sheets

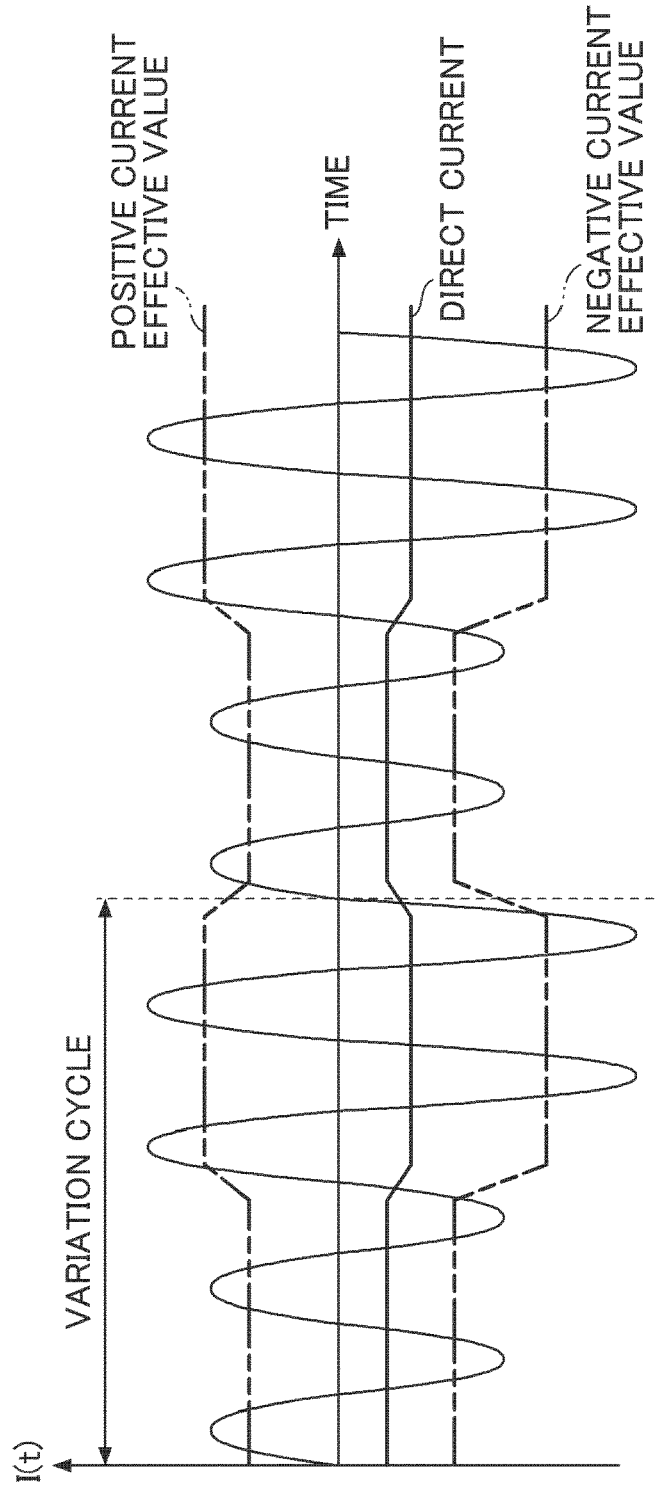
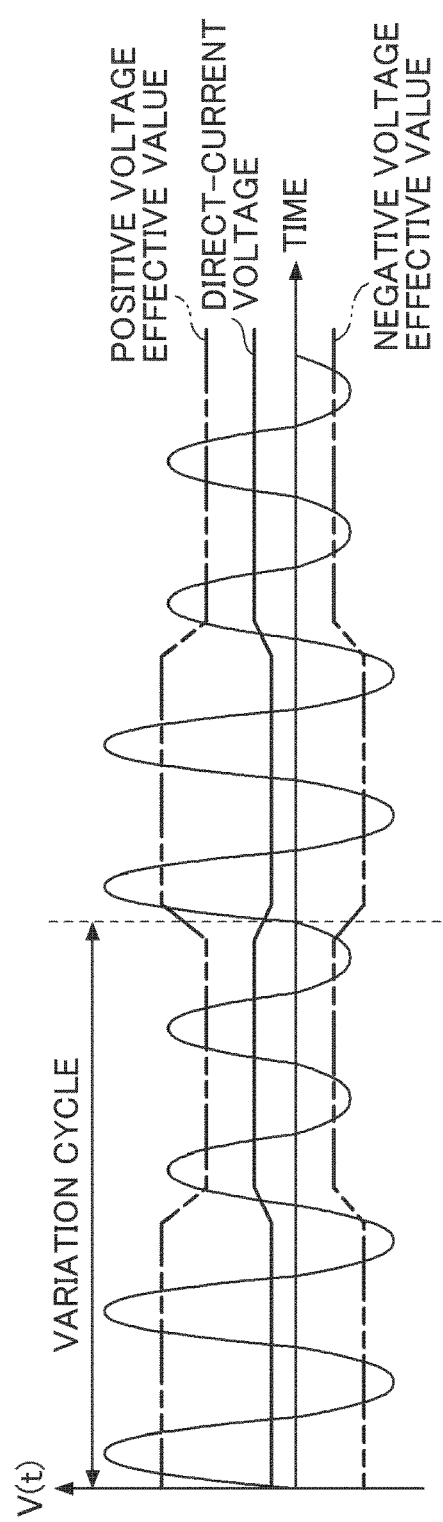

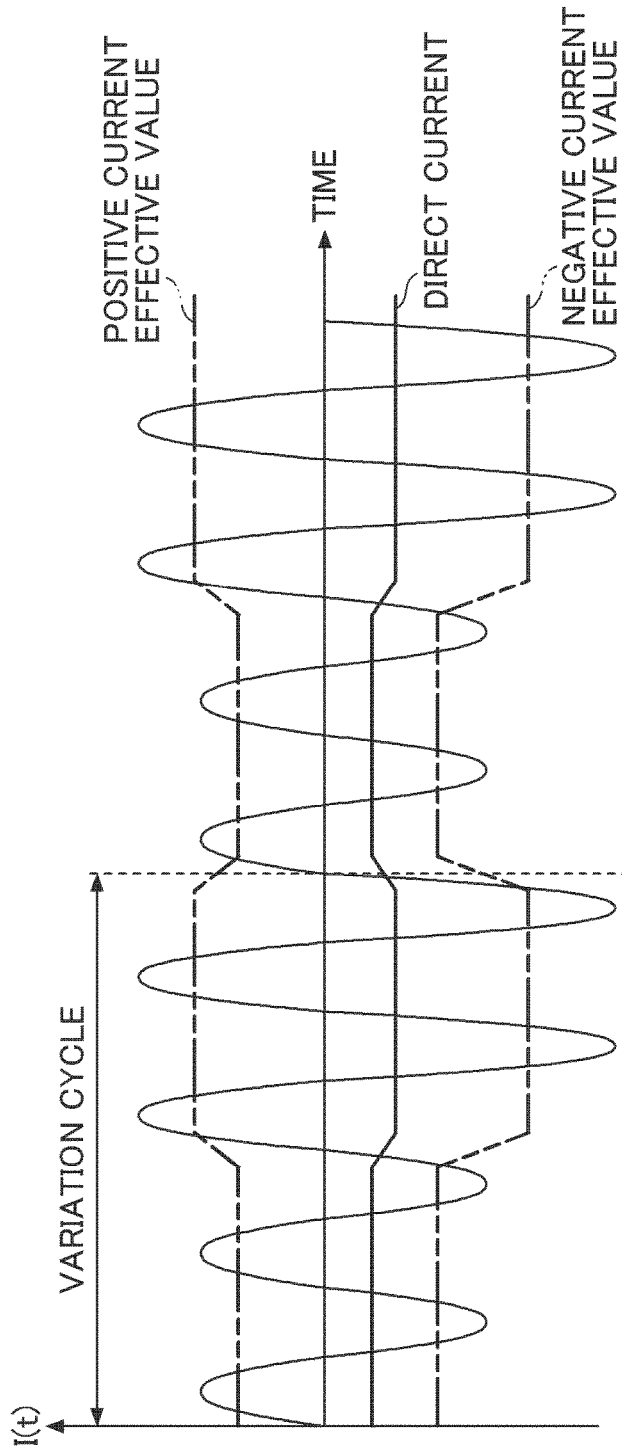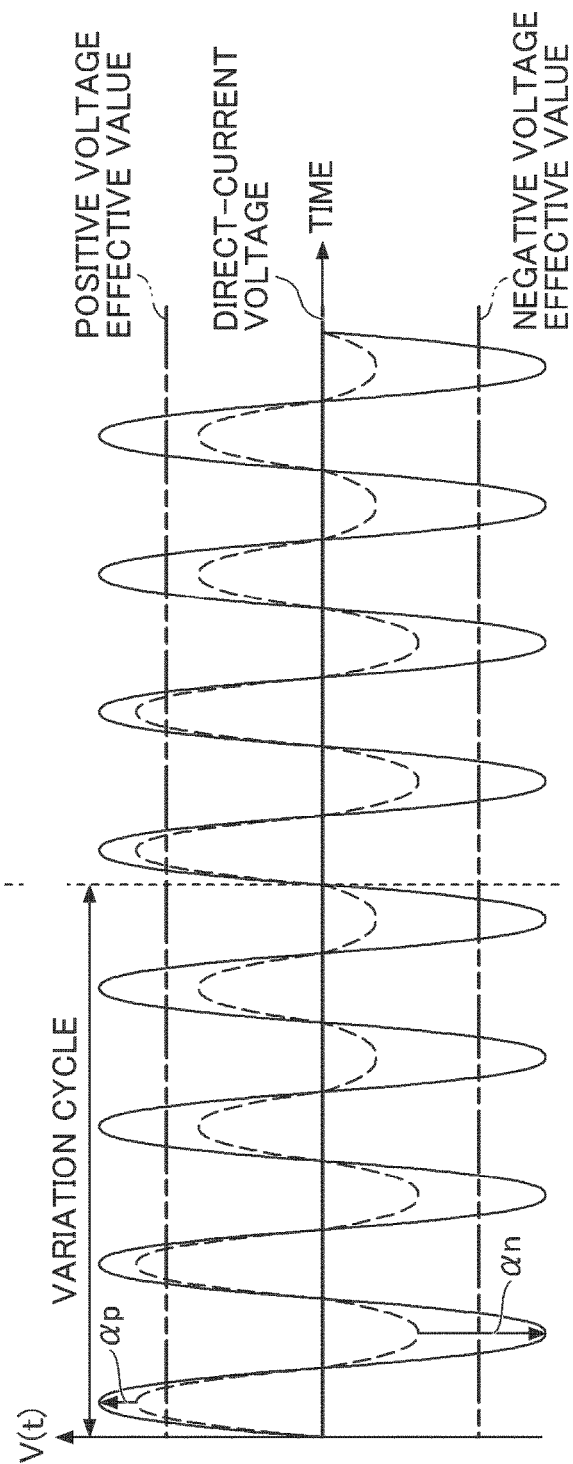
FIG. 14A
FIG. 14B

VOLTAGE GENERATION DEVICE, POWER CONTROL DEVICE, IMAGE FORMING APPARATUS, AND CONTROL METHOD

CROSS-REFERENCE TO RELATED APPLICATION

This patent application is based on and claims priority pursuant to 35 U.S.C. § 119(a) to Japanese Patent Application No. 2018-105151, filed on May 31, 2018, in the Japan Patent Office, the entire disclosure of which is hereby incorporated by reference herein.

BACKGROUND

Technical Field

The present disclosure relates to a voltage generation device, a power control device, an image forming apparatus, and a control method.

Related Art

In an electrophotographic image forming apparatus such as a digital multifunction peripheral, a charging roller (rotary body) is disposed in proximity of a surface of a photoconductor and applies a high voltage generated by a voltage generation device to the charging roller to uniformly charge the surface of the photoconductor to a predetermined potential.

As such a voltage generation device, a system is known that includes a direct-current power supply and an alternating-current power supply connected to the direct-current power supply and generates a voltage in which an alternating-current voltage is superimposed on a direct-current voltage, to apply the voltage to a charging roller.

In such a system, the potential on the surface of the photoconductor becomes equal to a direct-current component of the applied voltage, and the potential on the surface of the photoconductor can be controlled by adjusting the direct-current voltage.

SUMMARY

In an aspect of the present disclosure, there is provided a voltage generation device for generating a voltage in which an alternating-current voltage is superimposed on a direct-current voltage, to apply the voltage to a rotary body. The voltage generation device includes a direct-current power supply, an alternating-current power supply, a variation phase determiner, and a voltage controller. The alternating-current power supply is connected to the direct-current power supply. The variation phase determiner is configured to determine whether variation of an output voltage of the alternating-current power supply and variation of an output current of the alternating-current power supply are in opposite phases. The voltage controller is configured to perform gain correction for the output voltage in a case where the variation of the output voltage and the variation of the output current are in opposite phases.

In another aspect of the present disclosure, there is provided a power control device for controlling a power supply device including a direct-current power supply and an alternating-current power supply connected to the direct-current power supply, to generate a voltage in which an alternating-current voltage is superimposed on a direct-current voltage and to apply the voltage to a rotary body. The power control device includes a variation phase determiner and a voltage controller. The variation phase determiner is configured to determine whether variation of an output voltage of the alternating-current power supply and variation of an output current of the alternating-current power supply are in opposite phases. The voltage controller is configured to perform gain correction for the output voltage in a case where the variation of the output voltage and the variation of the output current are in opposite phases.

In still another aspect of the present disclosure, there is provided an image forming apparatus that includes the voltage generation device, a charging roller, and a photoconductor. The charging roller is the rotary body to which the voltage output from the voltage generation device is applied. The photoconductor is disposed in proximity of the charging roller.

In still yet another aspect of the present disclosure, there is provided a method for controlling a power supply device including a direct-current power supply and an alternating-current power supply connected to the direct-current power supply, to generate a voltage in which an alternating-current voltage is superimposed on a direct-current voltage and to apply the voltage to a rotary body. The method includes determining whether variation of an output voltage of the alternating-current power supply and variation of an output current of the alternating-current power supply are in opposite phases; and performing gain correction for the output voltage in a case where the variation of the output voltage and the variation of the output current are in opposite phases.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 13A and 13B are graphs illustrating waveforms of an output current and an output voltage from a conventional voltage generation device;

FIGS. 14A and 14B are graphs illustrating waveforms of an output current and an output voltage from the voltage generation device of the first embodiment;

Figure 1:
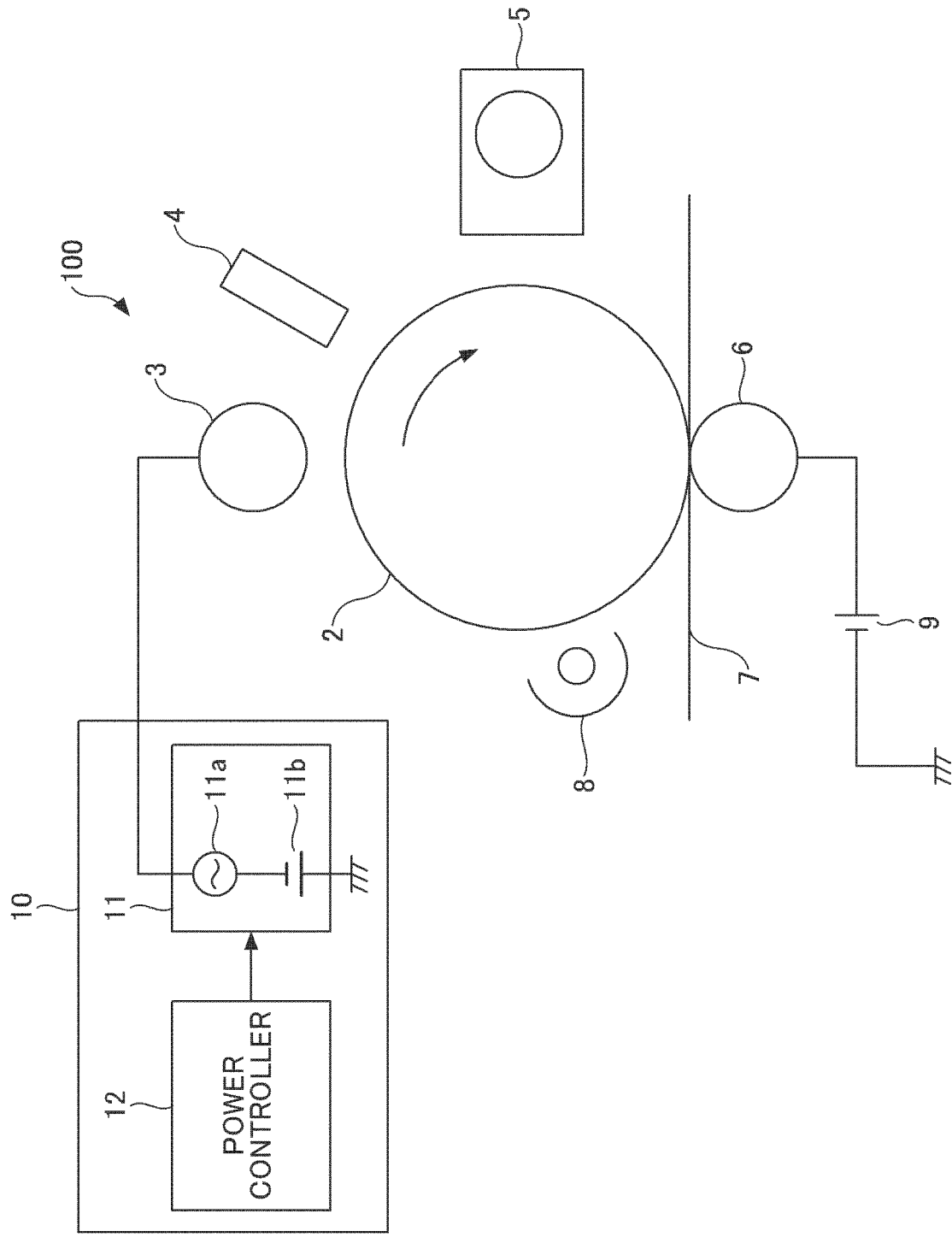
FIG. 1 is a diagram illustrating a schematic configuration of an image forming apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, a first embodiment of the present invention will be described referring to the drawings. FIG. 1 is a diagram illustrating a schematic configuration of an electrophotographic image forming apparatus 100.

In FIG. 1, the image forming apparatus 100 includes a voltage generation device 10, a photoconductor 2, a charging roller 3, an exposure device 4, a developing device 5, a primary transfer roller 6, an intermediate belt 7, a static eliminator 8, and a high-voltage power supply 9. The voltage generation device 10 includes a power supply device 11 and a power controller (power control device) 12. The power supply device 11 includes a direct-current power supply 11*b* and an alternating-current power supply 11*a* connected to the direct-current power supply 11*b*.

The charging roller 3 is a rotary body disposed in proximity of a surface of the drum-like photoconductor 2. A gap between the charging roller 3 and the photoconductor 2 is, for example, several tens of micrometers.

The power controller 12 controls operations of the alternating-current power supply 11*a* and the direct-current power supply 11*b*, and causes the power supply device 11 to generate a voltage in which an alternating-current voltage is superimposed on a direct-current voltage. The frequency of the alternating-current voltage is, for example, about 2 kHz. The direct-current voltage is a negative voltage and is, for example, −700 V.

The voltage generated by the power supply device 11 is applied to the charging roller 3. When the voltage is applied to the charging roller 3, a discharge occurs between the surface of the photoconductor 2 and a surface of the charging roller 3, and the surface of the photoconductor 2 is charged to a predetermined potential.

The exposure device 4 exposes the charged surface of the photoconductor 2 in accordance with an image signal. An electrostatic latent image is formed on the photoconductor 2 by the exposure of the exposure device 4. The developing device 5 develops a toner image on the photoconductor 2. The high-voltage power supply 9 applies a high voltage to the primary transfer roller 6. The toner image on the photoconductor 2 is transferred to the intermediate belt 7 by application of the high voltage to the primary transfer roller 6.

The toner image transferred to the intermediate belt 7 is transferred to a recording material by a secondary transfer device and is then fixed by a fixing device to form an image. The static eliminator 8 irradiates the surface of the photoconductor 2 with light to remove the charge on the surface of the photoconductor 2. Thereafter, charging processing is performed again on the surface of the photoconductor 2.

Note that, in a case of color printing, there are four similar configurations. The toner image is transferred to the intermediate belt for each color and then reaches the secondary transfer device and the fixing device.

Figure 2:
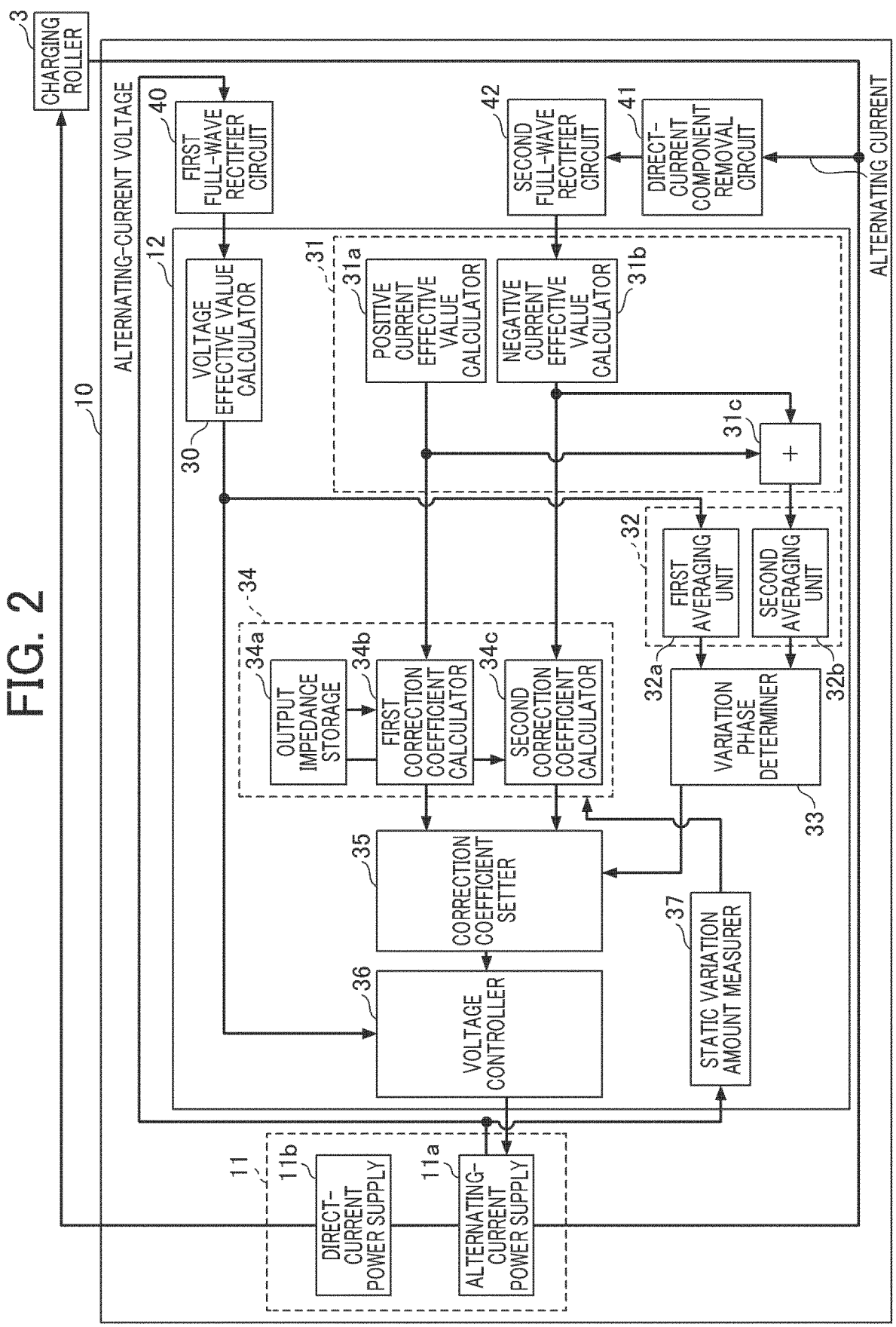
FIG. 2 is a diagram illustrating a configuration of a voltage generation device of a first embodiment.

FIG. 2 is a diagram illustrating a configuration of the voltage generation device 10 of the first embodiment. In FIG. 2, the power controller 12 included in the voltage generation device 10 includes a voltage effective value calculator 30, a current effective value calculator 31, an averaging unit 32, a variation phase determiner 33, a correction coefficient calculator 34, and a correction coefficient setting unit 35, a voltage controller 36, and a static variation amount measurer 37. The voltage generation device 10 further includes a first full-wave rectifier circuit 40, a direct-current component removal circuit 41, and a second full-wave rectifier circuit 42.

The first full-wave rectifier circuit 40 full-wave rectifies an alternating-current component of an output voltage output from the power supply device 11 and outputs a full-wave rectified voltage waveform. The voltage effective value calculator 30 calculates a voltage effective value Vrms on the basis of the full-wave rectified voltage waveform input from the first full-wave rectifier circuit 40. Here, the voltage effective value Vrms is expressed by the following expression (1). V(t) represents the voltage waveform. T represents a cycle of the voltage waveform.

[Expression 1]

$$Vrms = \sqrt{\frac{1}{T}\int_0^T V(t)^2 dt} \quad (1)$$

The voltage effective value calculator 30 calculates and outputs the voltage effective value Vrms in each cycle T.

The direct-current component removal circuit 41 removes a direct-current component from an output current output from the power supply device 11 and outputs a current from which the direct-current component has been removed. The second full-wave rectifier circuit 42 full-wave rectifies a current output from the direct-current component removal circuit 41 and outputs a full-wave rectified current waveform. The current effective value calculator 31 calculates a current effective value Irms on the basis of the full-wave rectified current waveform input from the second full-wave rectifier circuit 42. Here, the current effective value Irms is expressed by the following expression (2). I(t) represents the current waveform.

[Expression 2]

$$Irms = \sqrt{\frac{1}{T}\int_0^T I(t)^2 dt} \quad (2)$$

The current effective value calculator 31 includes a positive current effective value calculator 31a, a negative current effective value calculator 31b, and an adder 31c. The positive current effective value calculator 31a calculates a positive current effective value Iprms that is an effective value of a positive current, of the current from which the direct-current component has been removed by the direct-current component removal circuit 41. The negative current effective value calculator 31b calculates a negative current effective value Inrms that is an effective value of a negative current, of the current from which the direct-current component has been removed by the direct-current component removal circuit 41. Here, the positive current effective value Iprms and the negative current effective value Inrms are expressed by the following expressions (3) and (4), respectively.

[Expression 3]

$$Iprms = \sqrt{\frac{1}{T}\int_0^{T/2} Ip(t)^2 dt} \quad (3)$$

[Expression 4]

$$Inrms = \sqrt{\frac{1}{T}\int_0^{T/2} In(t)^2 dt} \quad (4)$$

The positive current effective value calculator 31a and the negative current effective value calculator 31b respectively calculate and output the positive current effective value Iprms and the negative current effective value Inrms in each cycle T.

The adder 31c adds the positive current effective value Iprms output from the positive current effective value calculator 31a and the negative current effective value Inrms calculated by the negative current effective value calculator 31b to calculate the above-described current effective value Irms. That is, the current effective value calculator 31 calculates and outputs the current effective value Irms in each cycle T.

The averaging unit 32 includes a first averaging unit 32a and a second averaging unit 32b. The first averaging unit 32a averages the voltage effective value Vrms output from the voltage effective value calculator 30 in each averaging cycle Tc that is a fixed cycle to calculate an average voltage effective value AVG (Vrms). The second averaging unit 32b averages the current effective value Irms output from the current effective value calculator 31 in each averaging cycle Tc to calculate an average current effective value AVG (Irms). Here, the average voltage effective value AVG (Vrms) and the average current effective value AVG (Irms) are expressed by the following expressions (5) and (6), respectively. n represents the number of cycles corresponding to the averaging cycle Tc. That is, n corresponds to the reciprocal of the averaging cycle Tc. Vrms(i) represents the voltage effective value Vrms in the cycle i. Irms(i) represents the current effective value Irms in the cycle i. Note that one cycle corresponds to one cycle T.

[Expression 5]

$$AVG(Vrms) = \frac{1}{n}\sum_{i=0}^{n} Vrms(i) \quad (5)$$

[Expression 6]

$$AVG(Irms) = \frac{1}{n}\sum_{i=0}^{n} Irms(i) \quad (6)$$

The averaging cycle Tc is stored in advance in a storage included in the power controller 12. The averaging cycle Tc is calculated on the basis of a variation cycle of a load current, that is, diameters of the charging roller 3 and the photoconductor 2 that are image forming parts. Here, for simplification of calculation, variation factors such as inductance noise are ignored. The cycle of load variation is favorably calculated on the basis of the diameter of the charging roller 3 having a smaller diameter than the photoconductor 2. For example, assuming that the circumference of the charging roller 3 is 40 mm and the linear velocity is 352.8 mm/s, the cycle of the load variation is 40/352.8≈113 ms. When setting the averaging cycle Tc to 1/10 times the cycle of the load variation, the averaging cycle Tc=11.3 ms.

Assuming that the cycle T as a calculation cycle of the above-described effective values is 0.5 ms, the number of cycles n for the above-described averaging is n=11.3/0.5≈23.

The first averaging unit 32a and the second averaging unit 32b calculate and output, for example, the average voltage effective value AVG (Vrms) and the average current effective value AVG (Irms) in each averaging cycle Tc. Note that the averaging cycle Tc is not limited to the value obtained by the above-described calculation method.

The variation phase determiner 33 determines whether time variation (variation with time) of the voltage effective value Vrms and time variation of the current effective value Irms are in opposite phases. Specifically, the variation phase determiner 33 calculates a voltage phase variation amount Vph and a current phase variation amount Iph in each averaging cycle Tc. Here, the voltage phase variation amount Vph and the current phase variation amount Iph are expressed by the following expressions (7) and (8), respectively. AVG (Vrms)' is the average voltage effective value previously output from the first averaging unit 32a. AVG (Irms)' is the average current effective value previously output from the second averaging unit 32b.

$$Vph = AVG(Vrms) - AVG(Vrms)' \quad (7)$$

$$Iph = AVG(Irms) - AVG(Irms)' \quad (8)$$

Note that the time variation of the voltage effective value Vrms and the current effective value Irms is caused by the above-described load variation. The time variation has a longer cycle than the calculation cycle of the effective values. Therefore, the variation phase determiner 33 calculates the voltage phase variation amount Vph and the current phase variation amount Iph on the basis of the average voltage effective value AVG (Vrms) and the average current effective value AVG (Irms) instead of the voltage effective value Vrms and the current effective value Irms.

Further, the variation phase determiner 33 determines that the variation phases are opposite phases in a case where a magnitude relationship of the average voltage effective value AVG (Vrms) output from the first averaging unit 32a with reference to the previous output value AVG (Vrms)' and a magnitude relationship of the average current effective value AVG (Irms) output from the second averaging unit 32b with reference to the previous output value AVG (Irms)' are different. Specifically, the variation phase determiner 33 determines that the variation phases are opposite phases in a case where "Vph>0 and Iph<0" are satisfied or in a case where "Vph<0 and Iph>0" are satisfied.

The correction coefficient calculator 34 includes an output impedance storage 34a, a first correction coefficient calculator 34b, and a second correction coefficient calculator 34c. The output impedance storage 34a stores an output impedance Z of the power supply device 11. The first correction coefficient calculator 34b calculates a first correction coefficient αp on the basis of the positive current effective value Iprms output from the positive current effective value calculator 31a and the output impedance Z stored in the output impedance storage 34a. The second correction coefficient calculator 34c calculates a second correction coefficient αn on the basis of the negative current effective value Inrms output from the negative current effective value calculator 31b and the output impedance Z stored in the output impedance storage 34a.

Specifically, the first correction coefficient calculator 34b and the second correction coefficient calculator 34c calculate the first correction coefficient αp and the second correction coefficient αn on the basis of the following expressions (9) and (10), respectively. Here, k is a static variation amount measured by the static variation amount measurer 37.

$$\alpha p = Z \times Iprms - k \quad (9)$$

$$\alpha n = Z \times Inrms - k \quad (10)$$

The correction coefficient setting unit 35 sets a correction coefficient for correcting a gain of the output voltage of the power supply device 11 on the basis of a determination result of the variation phase by the variation phase determiner 33. Specifically, the correction coefficient setting unit 35 sets a positive voltage correction coefficient gp as the first correction coefficient αp and a negative voltage correction coefficient gn as the second correction coefficient αn in a case where the above-described variation phases are determined to be the opposite phases by the variation phase determiner 33. Meanwhile, in a case where the variation phases are not the opposite phases, the correction coefficient setting unit 35 sets gp=0 and gn=0. Note that the positive voltage correction coefficient gp is a correction coefficient for correcting a gain of a positive voltage component (positive phase component) of the output voltage of the alternating-current power supply 11a. The negative voltage correction coefficient gn is a correction coefficient for correcting a negative voltage component (negative phase component) of the output voltage.

The voltage controller 36 performs feedback control of the output voltage of the power supply device 11 on the basis of the positive voltage correction coefficient gp and the negative voltage correction coefficient gn.

Although details will be described below, the static variation amount measurer 37 operates at the time of shipping inspection, and detects a maximum value and a minimum value of a positive-side peak value of the output voltage to measure the above-described static variation amount k and supplies the measured static variation amount k to the correction coefficient calculator 34. The static variation amount k is a variation amount of the voltage generated by the voltage generation device 10 itself under a fixed load condition.

Figure 3:
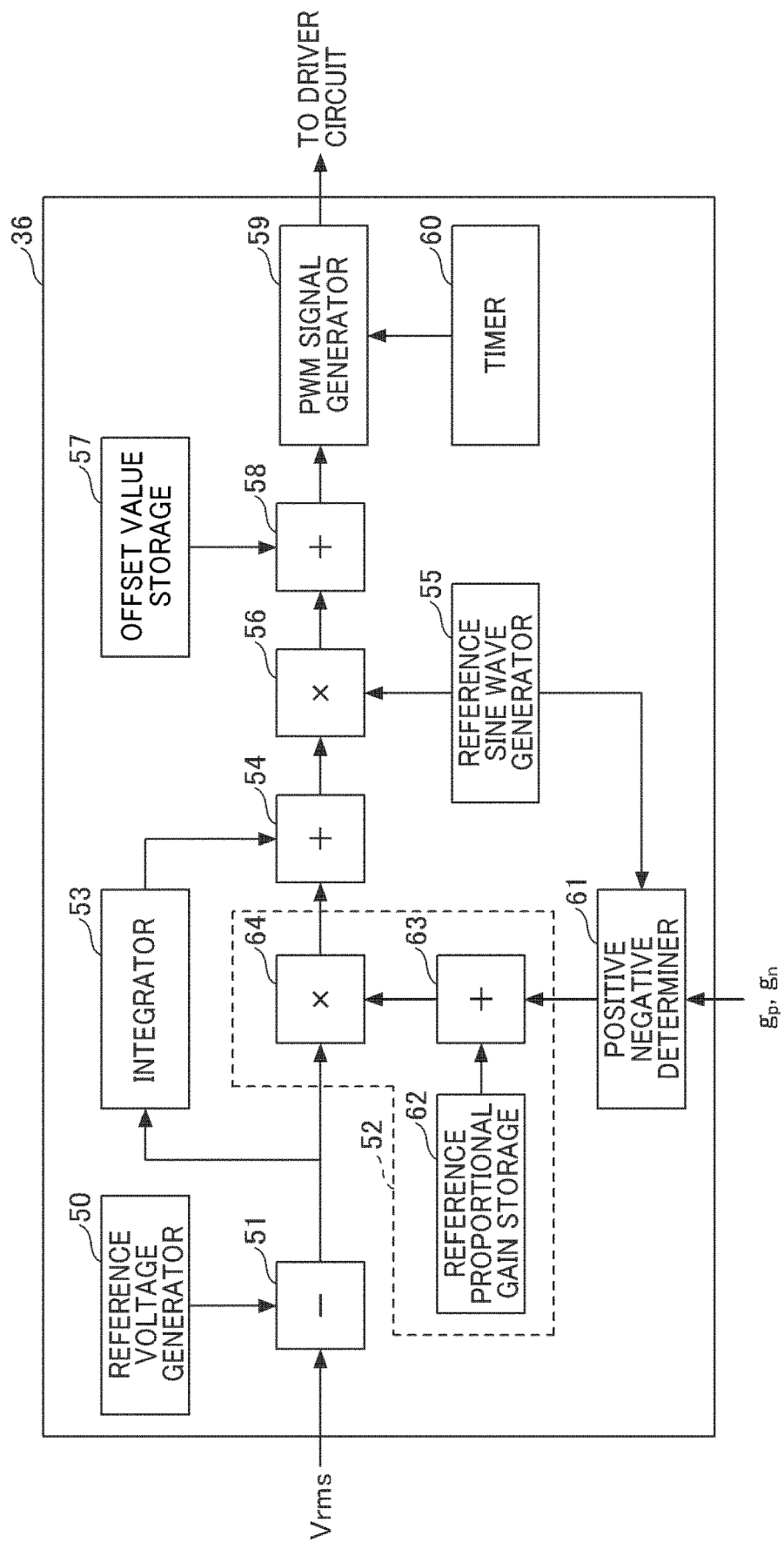
FIG. 3 is a diagram illustrating a configuration of a voltage controller.

FIG. 3 is a diagram illustrating a configuration of the voltage controller 36. In FIG. 3, the voltage controller 36 includes a reference voltage generator 50, a subtractor 51, a proportional unit 52, an integrator 53, a first adder 54, a reference sine wave generator 55, a first multiplier 56, an offset value storage 57, a second adder 58, a pulse width modulation (PWM) signal generator 59, a timer 60, and a positive negative determiner 61. The proportional unit 52, the integrator 53, and the first adder 54 constitute a proportional-integral (PI) controller.

The voltage effective value Vrms is input from the voltage effective value calculator 30 to the voltage controller 36. The reference voltage generator 50 generates a reference voltage. The subtractor 51 inputs a value obtained by subtracting the reference voltage from the voltage effective value Vrms to the proportional unit 52 and the integrator 53 included in the PI controller as a command input value. The proportional unit 52 performs proportional control of the command input value with a proportional gain Kp. The integrator 53 integrates the command input value with an integration gain Ki. The first adder 54 adds an output value of the proportional unit 52 and an output value of the integrator 53 and outputs a result.

The reference sine wave generator 55 generates a reference sine wave and outputs the reference sine wave. A frequency of the reference sine wave is, for example, 2 kHz. The first multiplier 56 multiplies an output value from the first adder 54, which is an output value from the PI controller, by the reference sine wave output from the reference voltage generator 50 and outputs a product. The offset value storage 57 stores an offset value caused by a switching circuit included in the alternating-current power supply 11a described below. The second adder 58 adds the offset value stored in the offset value storage 57 to an output value from the first multiplier 56 and outputs a result.

The PWM signal generator 59 generates a PWM signal and supplies the PWM signal to a driver circuit of the alternating-current power supply 11a. The driver circuit generates a drive signal (ON/OFF signal) and inputs the drive signal to the switching circuit.

The timer 60 supplies a clock signal to the PWM signal generator 59.

The positive negative determiner 61 determines positive or negative of the voltage on the basis of the reference sine wave generated by the reference voltage generator 50. Specifically, the positive negative determiner 61 determines that the voltage is positive in a case where the phase of the reference sine wave is positive (from 0° to 180°, exclusive of) 180° and determines that the voltage is negative in a case where the phase of the reference sine wave is negative (from 180° to 360°, exclusive of 360°). Further, the positive voltage correction coefficient gp and the negative voltage correction coefficient gn are input from the correction coefficient setting unit 35 to the positive negative determiner 61 as correction coefficients. The positive negative determiner 61 selects and outputs the positive voltage correction coefficient gp in the case where the voltage of the reference sine wave is positive, and selects and outputs the negative voltage correction coefficient gn in the case where the voltage of the reference sine wave is negative.

Next, details of the proportional unit 52 will be described. The proportional unit 52 includes a reference proportional gain storage 62, a third adder 63, and a second multiplier 64. The reference proportional gain storage 62 stores a value of a reference proportional gain Kpa.

The third adder 63 adds the positive voltage correction coefficient gp or the negative voltage correction coefficient gn output from the positive negative determiner 61 to the reference proportional gain Kpa stored in the reference proportional gain storage 62 to correct the reference proportional gain Kpa. This corrected reference proportional gain Kpa is used for proportional control as the above-described proportional gain Kp. Specifically, Kp=Kpa+gp is obtained when the voltage of the reference sine wave is positive, and Kp=Kpa+gn is obtained when the voltage of the reference sine wave is negative. The second multiplier 64 multiplies the above-described command input value by the proportional gain Kp output from the third adder 63.

Figure 4:
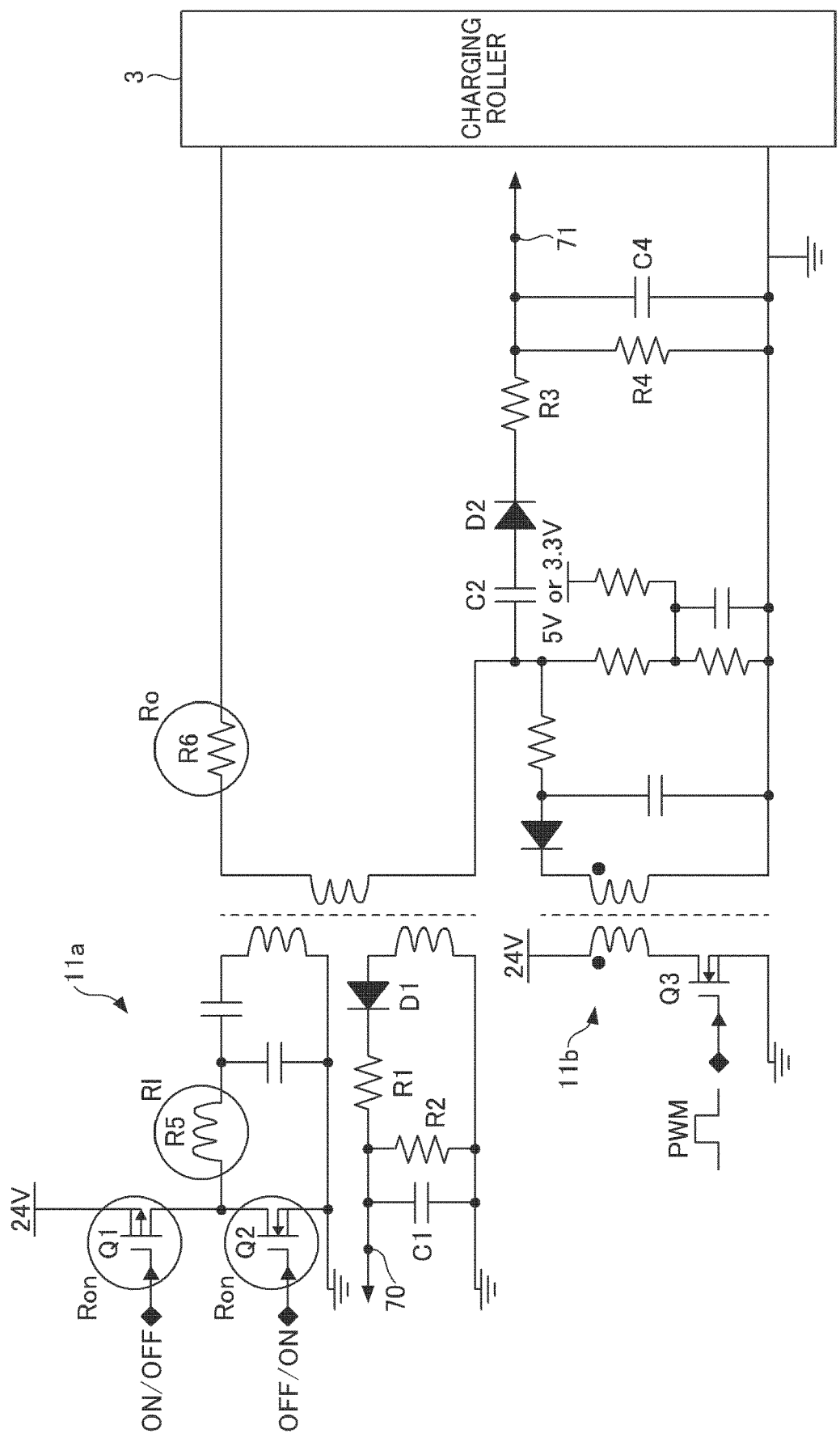
FIG. 4 is a diagram illustrating a specific circuit example of a power supply device.

FIG. 4 is a diagram illustrating a specific circuit example of the power supply device 11. In FIG. 4, the alternating-current power supply 11a includes a first transistor Q1 and a second transistor Q2 that constitute a half bridge circuit as a switching circuit. The drive signal is input from the above-described driver circuit to the first transistor Q1 and the second transistor Q2. The direct-current power supply 11b includes a third transistor Q3 to which the PWM signal for adjusting a direct-current voltage is input.

The above-described first full-wave rectifier circuit 40 includes a diode D1, resistors R1 and R2, and a capacitor C1. A voltage full-wave rectified by the first full-wave rectifier circuit 40 is output from a terminal 70 to the voltage controller 36. The above-described direct-current component removal circuit 41 includes a capacitor C2. Further, the above-described second full-wave rectifier circuit 42 includes a diode D2, resistors R3 and R4, and a capacitor C4. A current full-wave rectified by the second full-wave rectifier circuit 42 is output from a terminal 71 to the voltage controller 36.

The alternating-current power supply 11a illustrated in FIG. 4 has three major resistor components: an on resistor Ron of the first transistor Q1 or the second transistor Q2, a direct-current resistor R1 of the resistor R5, and an output resistor Ro of the resistor R6. For example, a value of a series impedance Z=Ron+R1+Ro of the resistors is stored as the output impedance Z in the above-described output impedance storage 34a.

Figure 5:
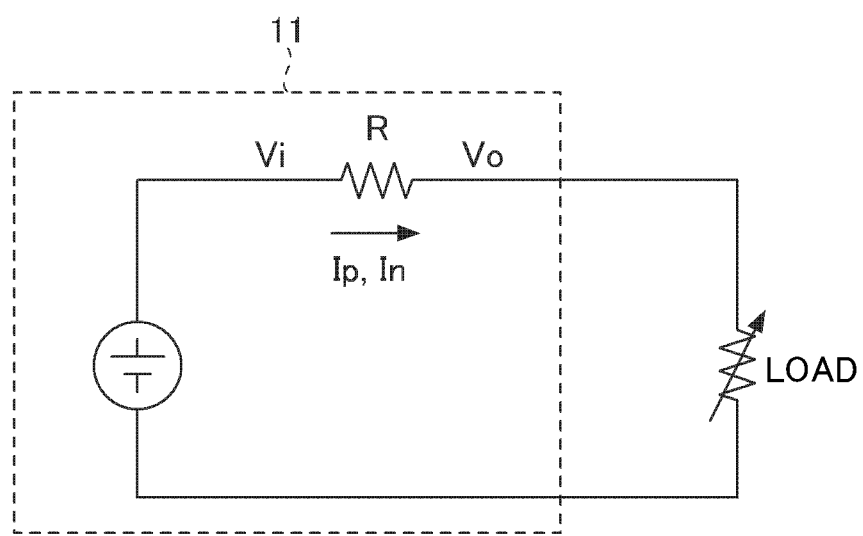
FIG. 5 is a diagram illustrating an equivalent circuit of the power supply device.

FIG. 5 is a diagram illustrating an equivalent circuit of the power supply device 11. In FIG. 5, a load resistor R is a combination of the three resistor components illustrated in FIG. 4. The load is a load resistor or the like caused by the charging roller 3 and the photoconductor 2 that are image forming parts. Due to distortion of the charging roller 3 and the photoconductor 2 and variation of the gap between the charging roller 3 and the photoconductor 2, the load resistor or the like changes and a load current (a positive current Ip and a negative current In) varies. Here, the positive current Ip is a load current of a case where the output voltage of the alternating-current power supply 11a is positive (positive phase). The negative current In is a load current of a case where the output voltage of the alternating-current power supply 11a is negative (negative phase).

The load current flowing through the load resistor R causes a voltage drop. A voltage drop amount changes and the output voltage from the power supply device 11 varies as the load current increases or decreases. Since the direct-current component of the output voltage output from the power supply device 11 is not zero, the positive current Ip and the negative current In flowing through the load resistor R are different. For example, the magnitude of the positive current Ip becomes smaller than the magnitude of the negative current In in the case where the direct-current component of the output voltage is negative.

Figure 6:
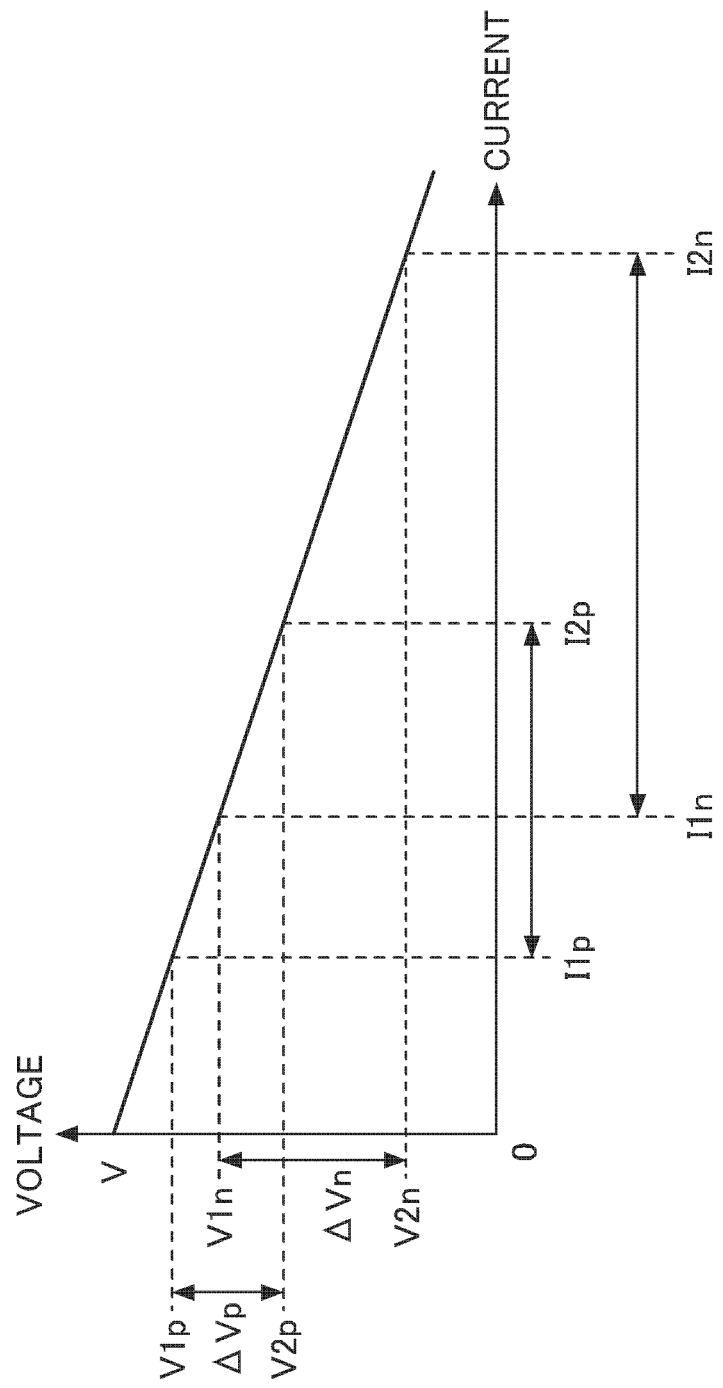
FIG. 6 is a graph illustrating a relationship between a load current flowing through a load resistor and a voltage drop amount.
Figure 7:
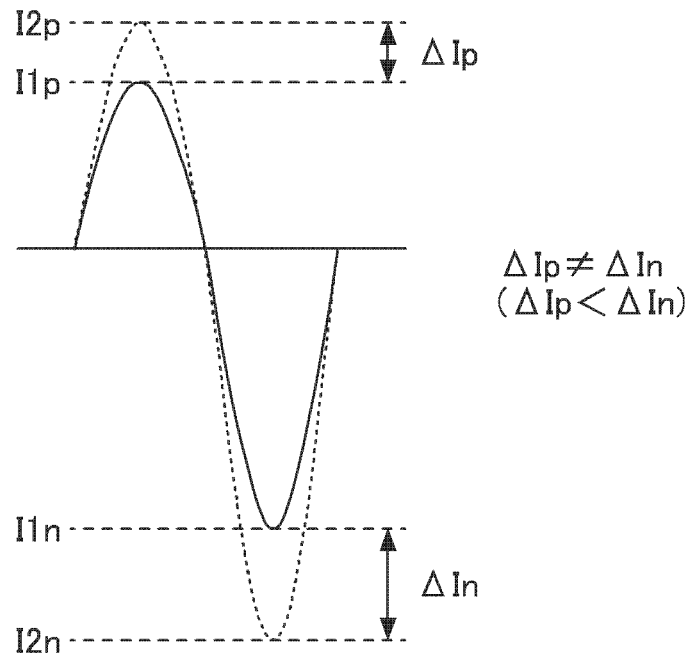
FIG. 7 is a graph illustrating variation of a current waveform in a case where load variation occurs.
Figure 8:
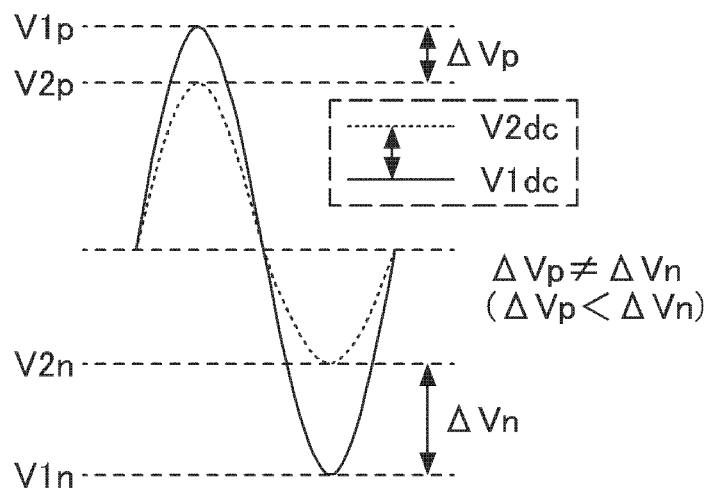
FIG. 8 is a graph illustrating variation of a voltage waveform in a case where load variation occurs.

Next, the reason why the direct-current component of the output voltage of the power supply device 11 varies due to load variation will be described in detail referring to FIGS. 6 to 8. FIG. 6 is a graph illustrating a relationship between the load current flowing through the load resistor R illustrated in FIG. 5 and the voltage drop amount. FIG. 7 is a graph illustrating variation of a current waveform in a case where load variation occurs. FIG. 8 is a graph illustrating variation of a voltage waveform in a case where load variation occurs.

As illustrated in FIG. 7, in a case where the positive current Ip varies from $I1p$ to $I2p$ due to the load variation, the voltage varies from $V1p$ to $V2p$, as illustrated in FIG. 8, according to the relationship between the voltage and the current illustrated in FIG. 6. Further, as illustrated in FIG. 7, in a case where the negative current In varies from $I1n$ to $I2n$ due to the load variation, the voltage varies from $V1n$ to $V2n$, as illustrated in FIG. 8, according to the relationship between the voltage and the current illustrated in FIG. 6. Since a variation amount $\Delta Vp$ and a variation amount $\Delta Vn$ are different, the direct-current component of the output voltage varies from $V1dc$ to $V2dc$, accordingly. The variation of the direct-current component causes an abnormal image.

As can be understood from FIGS. 6 to 8, a variation direction of the voltage and a variation direction of the current are opposite in the variation of the output of the power supply device 11 caused by the load variation.

Figure 9A:
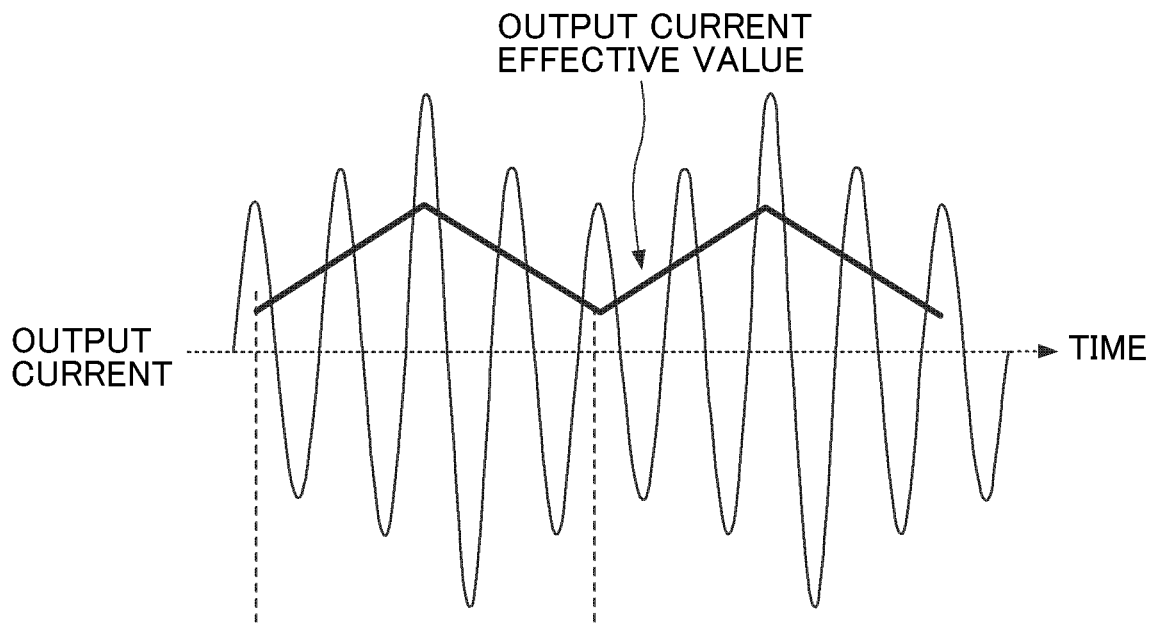
FIGS. 9A and 9B are graphs illustrating time variation of an output current and an output voltage in a case where variation is caused by a current due to load variation.
Figure 9B:
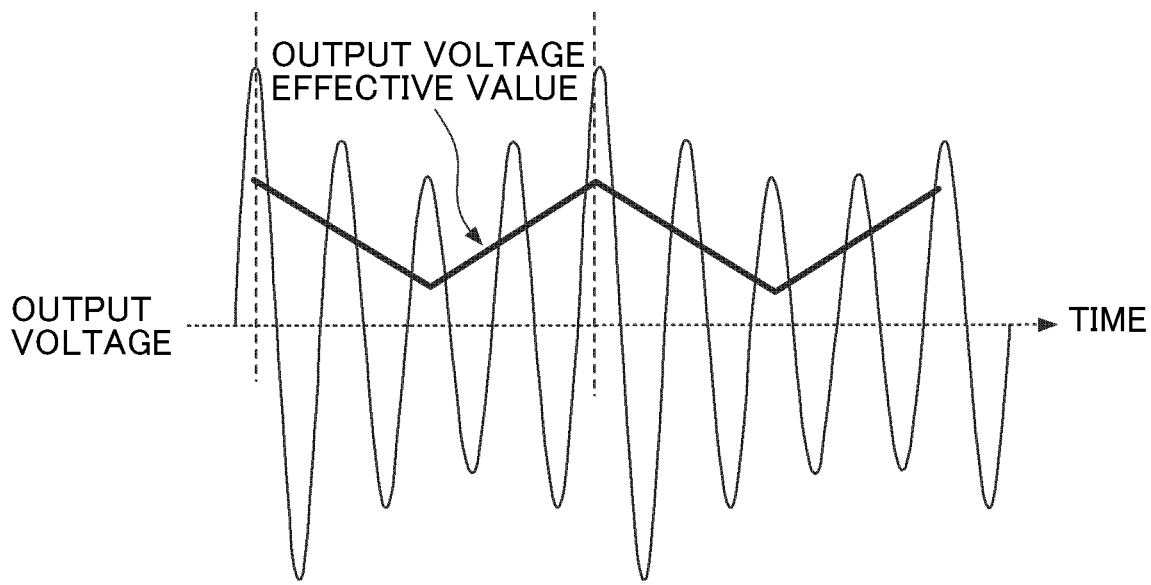
Figure 10A:
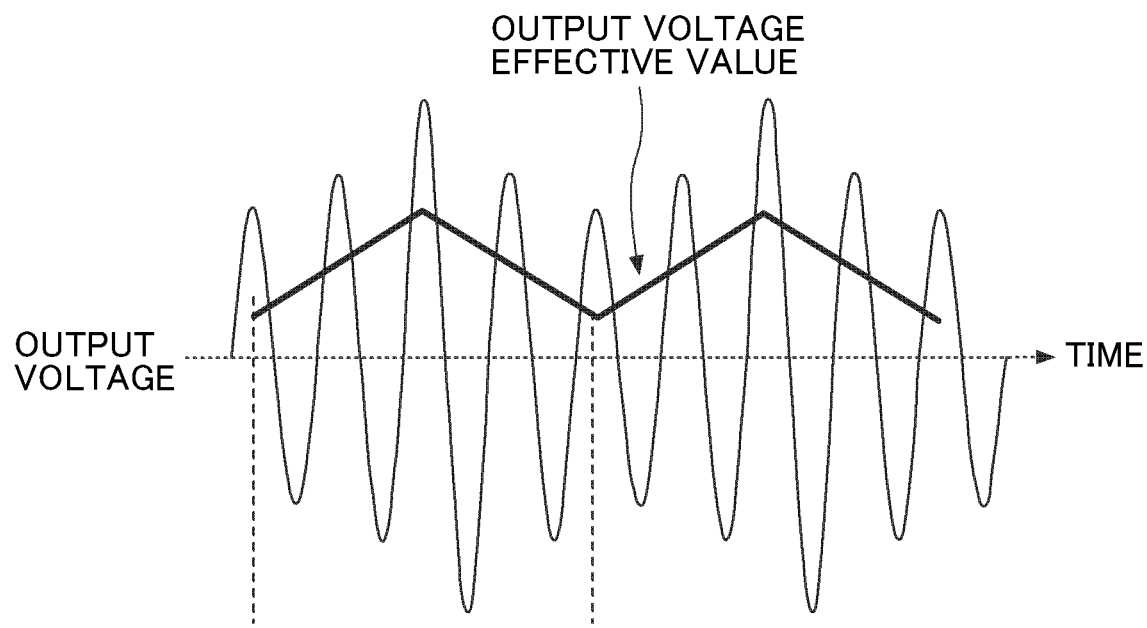
FIGS. 10A and 10B are graphs illustrating time variation of an output current and an output voltage in a case of occurrence of variation caused by a voltage.
Figure 10B:
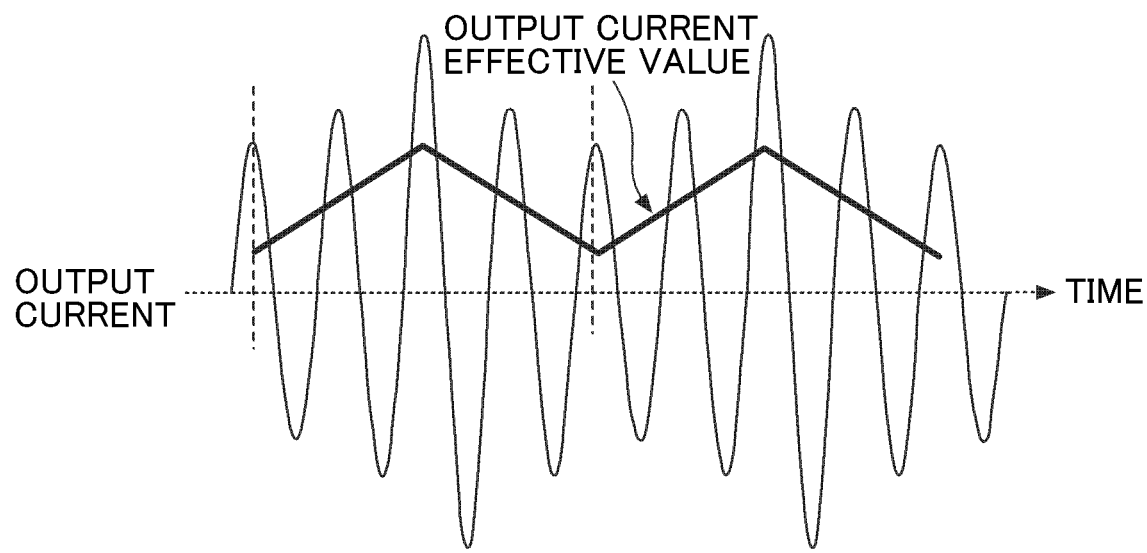

FIGS. 9A and 9B are graphs illustrating time variation of the output current and the output voltage in a case where variation is caused by the current due to the load variation. FIGS. 10A and 10B are graphs illustrating time variation of the output current and the output voltage in a case where variation is caused by the voltage.

As illustrated in FIGS. 9A and 9B, the time variation of the output current and the time variation of the output voltage become opposite phase in the case where variation is caused by the current due to the load variation. In contrast, as illustrated in FIGS. 10A and 10B, the time variation of the output current and the time variation of the output voltage become the same phase in the case where the variation is caused by the voltage. This variation caused by the voltage is caused by noise of the voltage generation device 10 itself, an abnormality of the control system, or the like. In the present embodiment, to determine whether the variation is caused by the current due to the load variation, whether the time variation of the output current and the time variation of the output voltage are the opposite phases is determined. Note that FIGS. 9A and 9B illustrate the time variations of the output current, the output voltage, and the effective values. Frequencies of the time variations are actually about 10 Hz and is significantly lower than 2 KHz that is the frequency of the output voltage.

Figure 11:
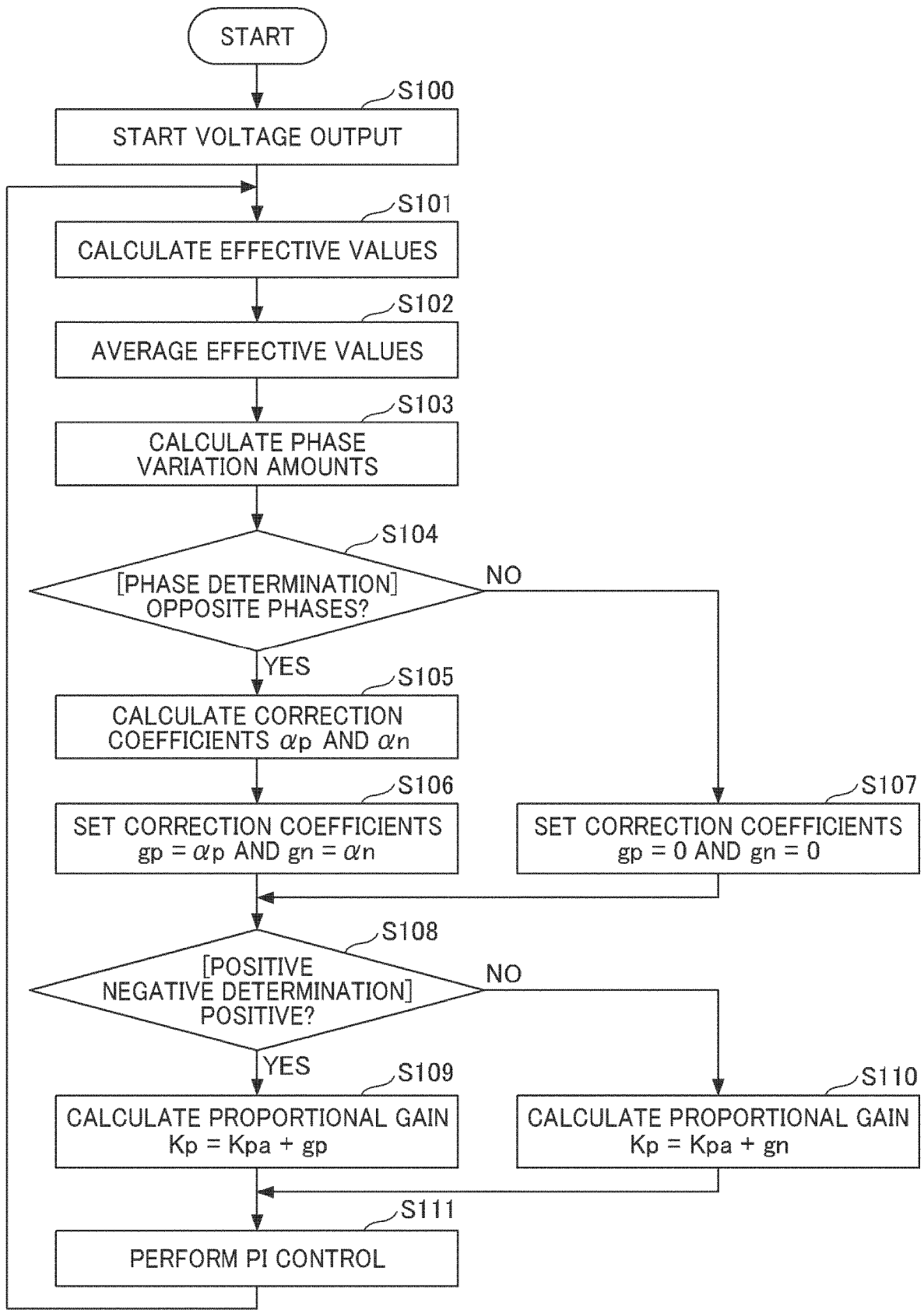
FIG. 11 is a flowchart for describing an operation of the voltage generation device.

Next, an operation of the voltage generation device 10 of the present embodiment will be described. FIG. 11 is a flowchart for describing the operation of the voltage generation device 10.

First, the power supply device 11 starts an output of the voltage in which the alternating-current voltage is superimposed on the direct-current voltage (step S100). Then, the voltage effective value calculator 30 and the current effective value calculator 31 calculate the voltage effective value Vrms and the current effective value Irms on the basis of the above expressions (1) and (2) (step S101). Here, the current effective value Irms is obtained by adding the positive current effective value Iprms calculated by the positive current effective value calculator 31a on the basis of the above expression (3) and the negative current effective value Inrms calculated by the negative current effective value calculator 31b on the basis of the above expression (4) by the adder 31c.

The averaging unit 32 averages the voltage effective value Vrms and the current effective value Irms on the basis of the above expressions (5) and (6), respectively, to calculate the average voltage effective value AVG (Vrms) and the average current effective value AVG (Irms) (step S102).

Then, the variation phase determiner 33 calculates the voltage phase variation amount Vph and the current phase variation amount Iph on the basis of the above expressions (7) and (8) (step S103). Further, the variation phase determiner 33 determines whether the time variation of the voltage effective value Vrms and the time variation of the current effective value Irms are opposite phases (step S104).

In the case where the variation phases are opposite phases (step S104: YES), the correction coefficient calculator 34 calculates the first correction coefficient $\alpha p$ and the second correction coefficient $\alpha n$ (step S105). Here, the first correction coefficient $\alpha p$ is calculated on the basis of the above expression (9). The second correction coefficient $\alpha n$ is calculated on the basis of the above expression (10). The correction coefficient setting unit 35 sets the calculated first correction coefficient $\alpha p$ and second correction coefficient $\alpha n$ as the positive voltage correction coefficient gp and the negative voltage correction coefficient gn, respectively (step S106).

Meanwhile, in the case where the variation phases are not the opposite phases (step S104: NO), the correction coefficient setting unit 35 sets the positive voltage correction coefficient gp and the negative voltage correction coefficient gn to "0" (step S107).

The positive voltage correction coefficient gp and the negative voltage correction coefficient gn are supplied to the voltage controller 36, and the positive negative determiner 61 in the voltage controller 36 performs positive negative determination of the voltage of the reference sine wave on the basis of the phase of the reference sine wave generated by the reference voltage generator 50 (step S108). The positive negative determiner 61 supplies the positive voltage correction coefficient gp to the third adder 63 to add the positive voltage correction coefficient gp to the reference proportional gain Kpa in the case where the voltage of the reference sine wave is positive (step S109). Meanwhile, the positive negative determiner 61 supplies the negative voltage correction coefficient gn to the third adder 63 to add the negative voltage correction coefficient gn to the reference proportional gain Kpa in the case where the voltage of the reference sine wave is negative (step S110).

Then, the PI controller performs the PI control using the value obtained by adding the positive voltage correction coefficient gp or the negative voltage correction coefficient gn to the reference proportional gain Kpa as the proportional gain Kp (step S111). Thereafter, the processing returns to step S100 and similar processing is repeatedly performed.

Figure 12:
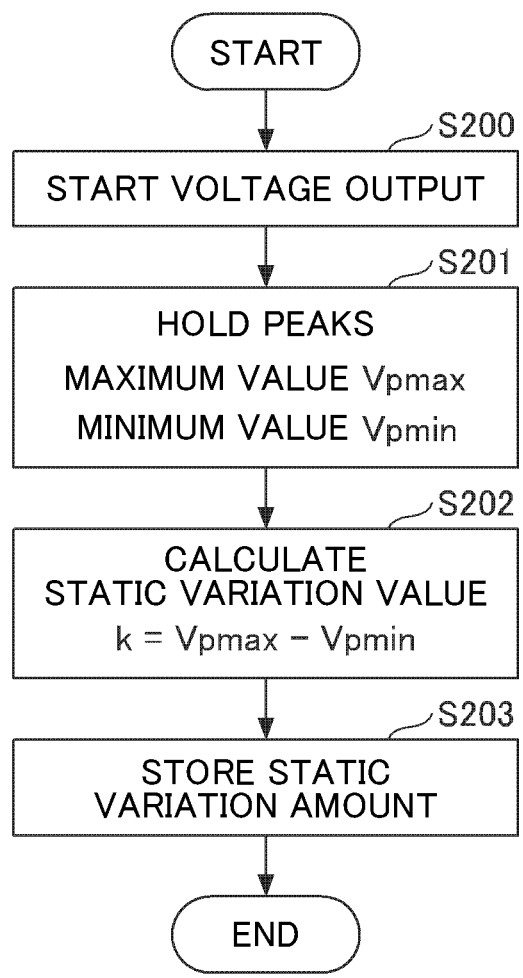
FIG. 12 is a flowchart for describing an operation of a static variation amount measurer.

Next, an operation of the static variation amount measurer 37 will be described. FIG. 12 is a flowchart for describing the operation of the static variation amount measurer 37. The static variation amount measurer 37 is operated in a state where no load variation occurs such as at the time of shipping inspection.

First, the power supply device 11 starts the output of the voltage in which the alternating-current voltage is superimposed on the direct-current voltage (step S200). Next, the static variation amount measurer 37 includes a peak hold circuit and detects and holds a maximum Vpmax of the positive peak and a minimum value Vpmin of the positive peak of the output voltage output from the power supply device 11 (step S201). Then, the static variation amount measurer 37 subtracts the minimum value Vpmin from the maximum Vpmax to calculate the static variation amount k (step S202) and stores the calculated static variation amount k (step S203).

Next, effects of the image forming apparatus 100 of the present embodiment will be described. FIG. 13A is a graph illustrating an output current waveform from a conventional voltage generation device. FIG. 13B is a graph illustrating an output voltage waveform from the conventional voltage generation device. In the conventional voltage generation device, the output current increases or decreases as illustrated in FIG. 13A as the above-described load variation occurs. Since the output voltage is biased, current amounts are different between positive and negative alternating-current components of the output current. The waveform of the alternating-current component of the output voltage is distorted and the positive and negative alternating-current components become asymmetrical as illustrated in FIG. 13B as the voltage drop amount varies due to the increase or decrease in the output current. As a result, the direct-current voltage component of the output voltage from the voltage generation device varies, and the potential on the surface of the photoconductor 2 varies. The image forming apparatus generates an abnormal image including color unevenness and the like, accordingly.

FIG. 14A is a graph illustrating the output current waveform from the voltage generation device 10 of the present embodiment. FIG. 14B is a graph illustrating the output voltage waveform from the voltage generation device 10 of the present embodiment. The output current waveform illustrated in FIG. 14A is similar to the conventional case and increases or decreases due to the load variation. In the present embodiment, whether the variation of the voltage waveform is due to the load variation is determined by determining whether the time variation of the voltage effective value and the time variation of the current effective value are the opposite phases. Then, in the case where the variation of the voltage waveform is due to the load variation, the gain of the output voltage is corrected using the first correction coefficient $\alpha p$ and the second correction coefficient $\alpha n$ calculated on the basis of the positive current effective value and the negative current effective value. With the gain correction, the distortion of the waveform of the alternating-current component of the output voltage is suppressed as illustrated in FIG. 14B. As a result, the variation of the direct-current voltage component of the output voltage from the voltage generation device 10 is suppressed, and the potential on the surface of the photoconductor 2 becomes uniform. Thereby, occurrence of an abnormal image including color unevenness and the like is suppressed in the image forming apparatus 100.

Figure 15:
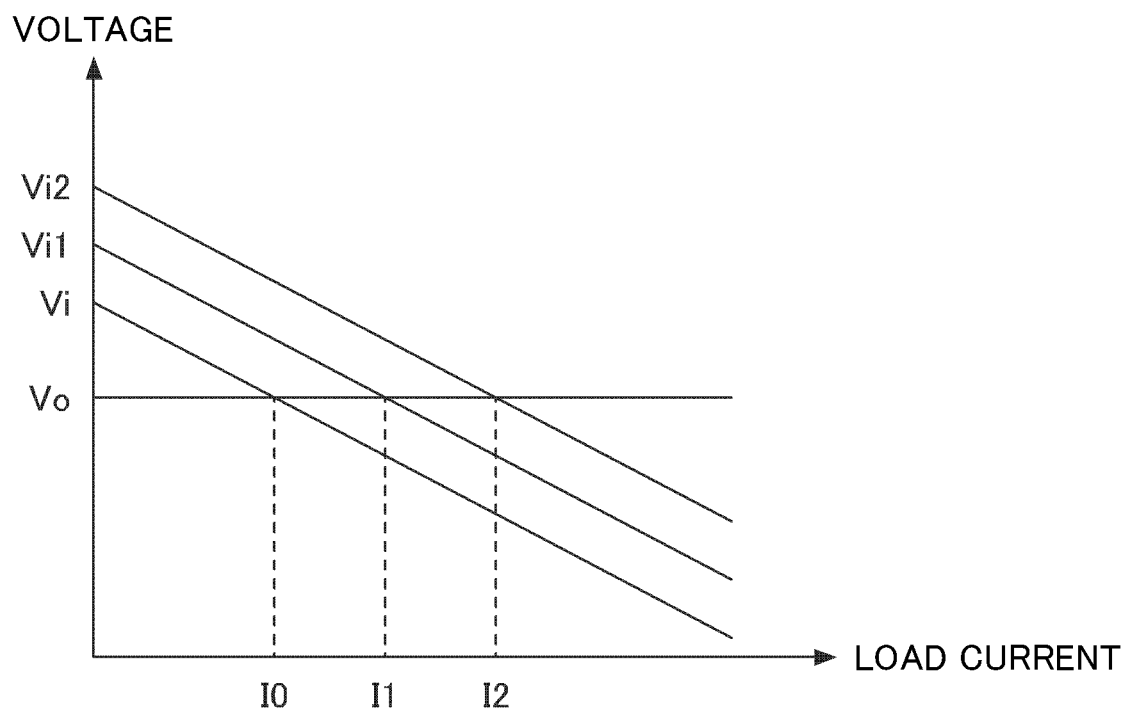
FIG. 15 is a graph illustrating a relationship between a variable voltage and a load current.

The above-described gain control corresponds to controlling a variable voltage Vi on the basis of the values of the load currents (the positive current Ip and the negative current In) to stabilizing an output voltage Vo in the equivalent circuit illustrated in FIG. 5. As illustrated in FIG. 15, in a case where the load current varies from I0 to I1, for example, the output voltage Vo can be kept constant by changing the variable voltage Vi to Vi1 by the gain correction. Similarly, in a case where the load current varies from I0 to I2, for example, the output voltage Vo can be kept constant by changing the variable voltage Vi to Vi2 by the gain correction.

Note that, in the image forming apparatus 100 of the present embodiment, the correction coefficient setting unit 35 sets gp=0 and gn=0 in the case where the variation phases are not the opposite phases. However, an embodiment is not limited to the case, and the correction coefficient setting unit 35 may set gp=−k and gn=−k, using the static variation amount k.

Further, in the present embodiment, the first correction coefficient calculator 34b calculates the first correction coefficient αp on the basis of the positive current effective value Iprms. However, an embodiment is not limited to the case, and the first correction coefficient calculator 34b may calculate the first correction coefficient αp on the basis of an value obtained by averaging the positive current effective value Iprms with the averaging cycle Tc. Similarly, the second correction coefficient calculator 34c may calculate the second correction coefficient an on the basis of a value obtained by averaging the negative current effective value Inrms with the averaging cycle Tc.

Second Embodiment

Figure 16:
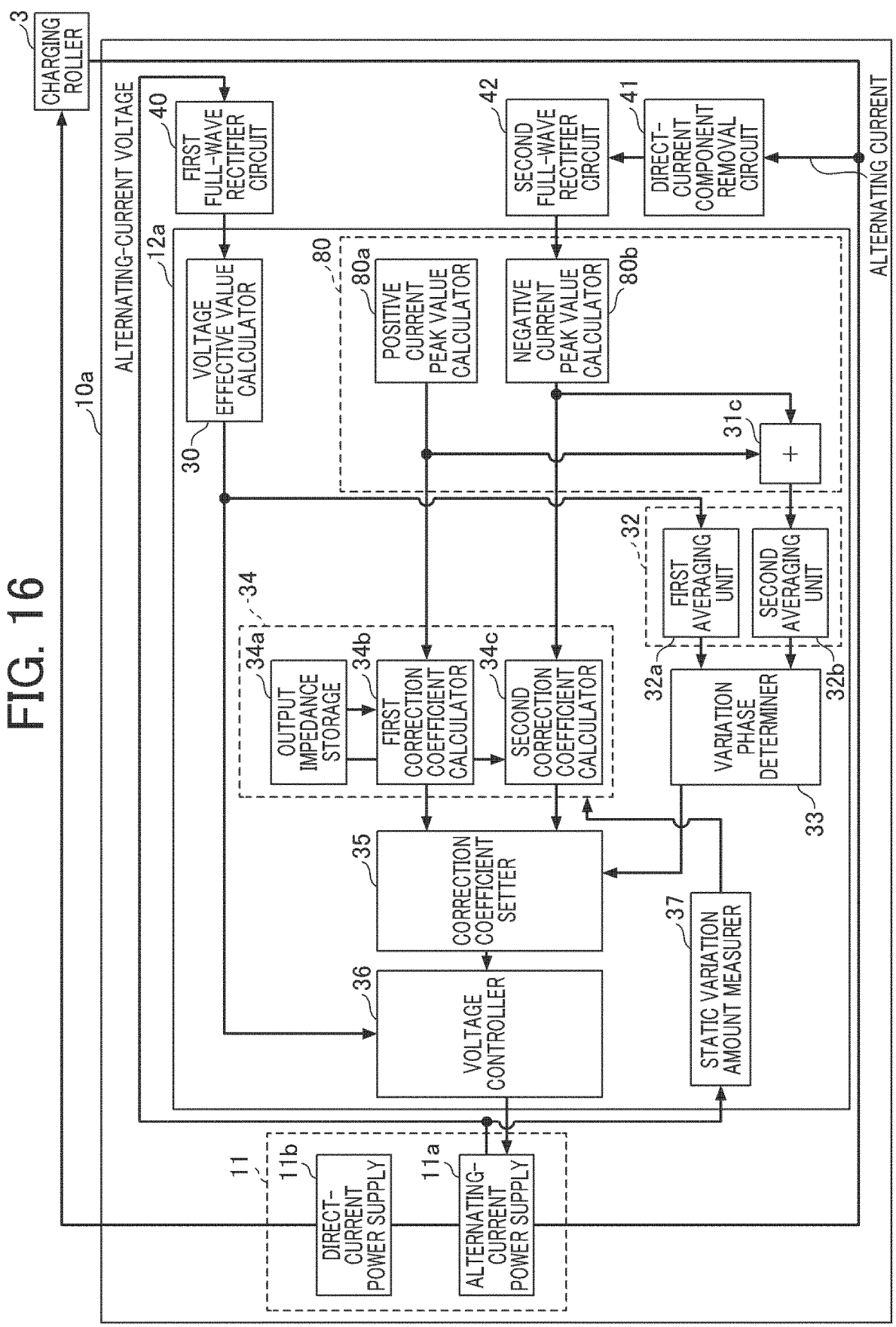
FIG. 16 is a diagram illustrating a configuration of a power controller of a second embodiment.

Next, an image forming apparatus according to a second embodiment will be described. A voltage generation device 10a included in the image forming apparatus of the second embodiment uses a power controller 12a having a configuration illustrated in FIG. 16 in place of the power controller 12 having the configuration illustrated in FIG. 2. The power controller 12a includes a current peak value detector 80 in place of the current effective value calculator 31. The other components are similar to the components of the first embodiment. The components similar to the components in the first embodiment are given the same reference numerals and descriptions is omitted.

The current peak value detector 80 includes a positive current peak value detector 80a and a negative current peak value detector 80b. The positive current peak value detector 80a detects a positive current peak value Ipp during one cycle T on the basis of a full-wave rectified current waveform input from a second full-wave rectifier circuit 42. The negative current peak value detector 80b detects a negative current peak value Inp during the one cycle T on the basis of the full-wave rectified current waveform input from the second full-wave rectifier circuit 42.

In the present embodiment, the positive current peak value Ipp detected by the positive current peak value detector 80a is input to an adder 31c, in place of the positive current effective value Iprms. Similarly, the negative current peak value Inp detected by the negative current peak value detector 80b is input to the adder 31c, in place of the negative current effective value Inrms.

In the present embodiment, the adder 31c adds the positive current peak value Ipp and the negative current peak value Inp to calculate a current peak value Ips. That is, the current peak value detector 80 detects the current peak value Ips in each cycle T. The current peak value Ips output from the current peak value detector 80 is input to a second averaging unit 32b, in place of the current effective value Irms. The second averaging unit 32b averages the current peak value Ips input from the current peak value detector 80 over a predetermined averaging cycle Tc to calculate an average current peak value AVG (Ips).

Phase determination by a variation phase determiner 33 is similar to the first embodiment except that the average current peak value AVG (Ips) is used in place of the average current effective value AVG (Irms).

Further, the positive current peak value Ipp detected by the positive current peak value detector 80a is input to a first correction coefficient calculator 34b. Further, the negative current peak value Inp detected by the negative current peak value detector 80b is input to a second correction coefficient calculator 34c. In the present embodiment, the first correction coefficient calculator 34b and the second correction coefficient calculator 34c calculate a first correction coefficient αp and a second correction coefficient an on the basis of the following expressions (11) and (12), respectively.

$$\alpha p = Z \times Ipp - k \quad (11)$$

$$\alpha n = Z \times Inp - k \quad (12)$$

A waveform of an alternating-current component of an output voltage due to load variation is suppressed in the present embodiment, similarly to the first embodiment. As a result, variation of a direct-current voltage component of an output voltage from the voltage generation device 10a is suppressed, a potential on a surface of a photoconductor 2 becomes uniform, and occurrence of an abnormal image is suppressed.

Note that, in the present embodiment, as for the voltage, a voltage effective value Vrms is calculated by a voltage effective value calculator 30. However, a voltage peak value calculator that detects a voltage peak value may be provided in place of the voltage effective value calculator 30, similarly to the current.

Third Embodiment

Figure 17:
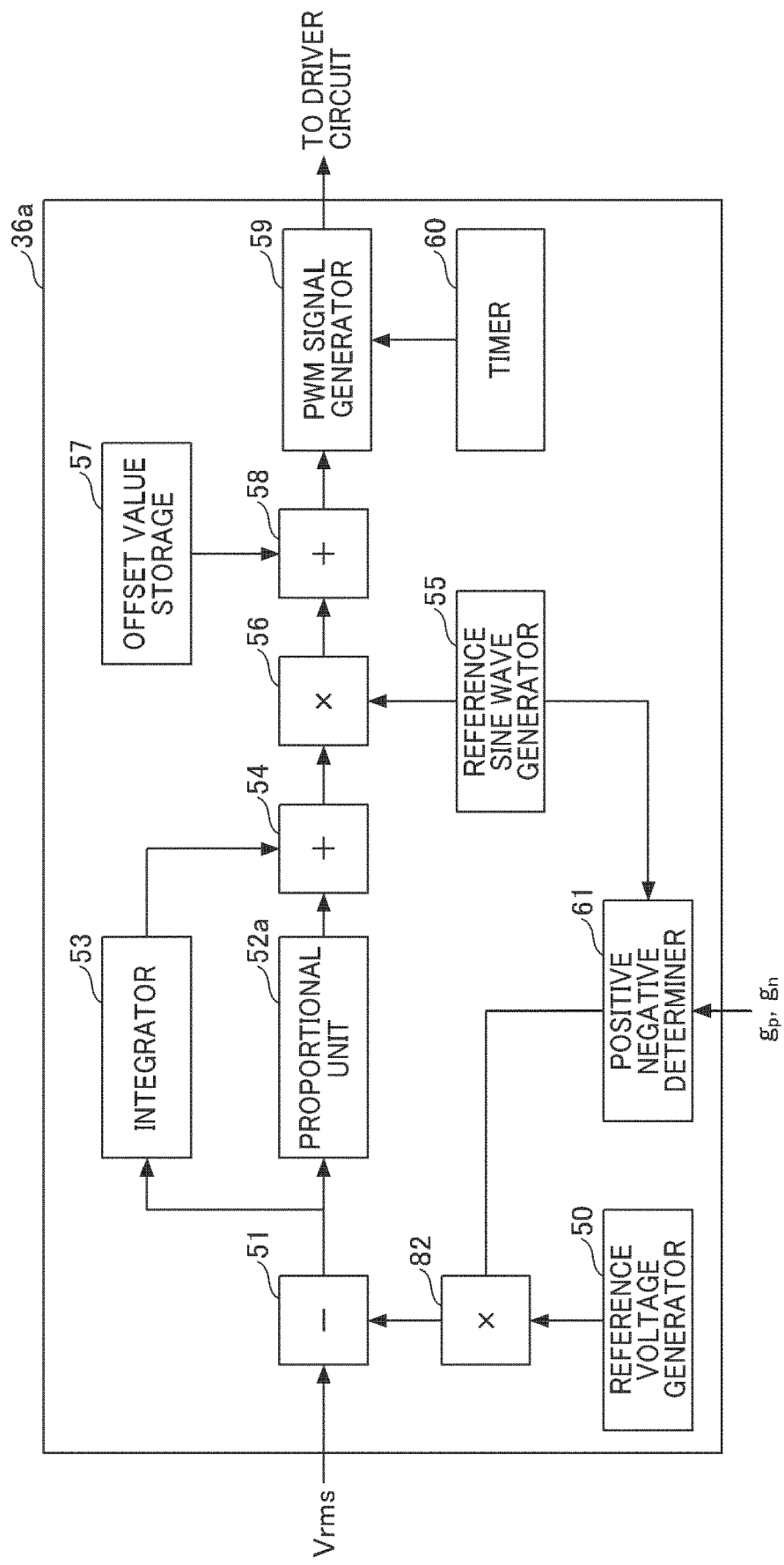
FIG. 17 is a diagram illustrating a configuration of a voltage controller of a third embodiment.

Next, an image forming apparatus according to a third embodiment will be described. The image forming apparatus of the third embodiment uses a voltage controller 36a having a configuration illustrated in FIG. 17 in place of the voltage controller 36 having the configuration illustrated in FIG. 3. The voltage controller 36a is different from the voltage controller 36 of the first embodiment in including a proportional unit 52a in place of the proportional unit 52 and including a second multiplier 82 between a reference voltage generator 50 and a subtractor 51. The other components are similar to the components of the first embodiment. The components similar to the components in the first embodiment are given the same reference numerals and descriptions is omitted.

The proportional unit 52a performs proportional control of a command input value with a proportional gain Kp. In the present embodiment, correction coefficients (a positive voltage correction coefficient gp and a negative voltage correction coefficient gn) are not input from a positive negative determiner 61 to the proportional unit 52a. That is, in the present embodiment, the proportional gain Kp is not corrected unlike the first embodiment.

In the present embodiment, the positive negative determiner 61 inputs the positive voltage correction coefficient gp or the negative voltage correction coefficient gn to the second multiplier 82 according to a positive or negative voltage of a reference sine wave generated by the reference voltage generator 50. Specifically, the positive negative determiner 61 selects and inputs the positive voltage correction coefficient gp to the second multiplier 82 in a case where the voltage of the reference sine wave is positive, and selects and inputs the negative voltage correction coefficient gn to the second multiplier 82 in a case where the voltage of the reference sine wave is negative.

The second multiplier 82 multiplies the reference voltage generated by the reference voltage generator 50 by the correction coefficient input from the positive negative determiner 61 and supplies a product to the subtractor 51. Specifically, the second multiplier 82 supplies a voltage value obtained by multiplying the reference voltage by the positive voltage correction coefficient gp to the subtractor 51 in the case where the voltage of the reference sine wave is positive, and supplies a voltage value obtained by multiplying the reference voltage by the negative voltage correction coefficient gn to the subtractor 51 in the case where the voltage of the reference sine wave is negative.

Note that, in the present embodiment, a correction coefficient setting unit 35 sets gp=1 and gn=1 in a case where variation phases of the voltage and the current are not opposite phases.

Therefore, in the present embodiment, in the case where the variation phases are opposite phases, gain correction of the reference voltage is performed instead of the proportional gain of PI control, whereby distortion of a waveform of an alternating-current component of an output voltage is suppressed.

Fourth Embodiment

Figure 18:
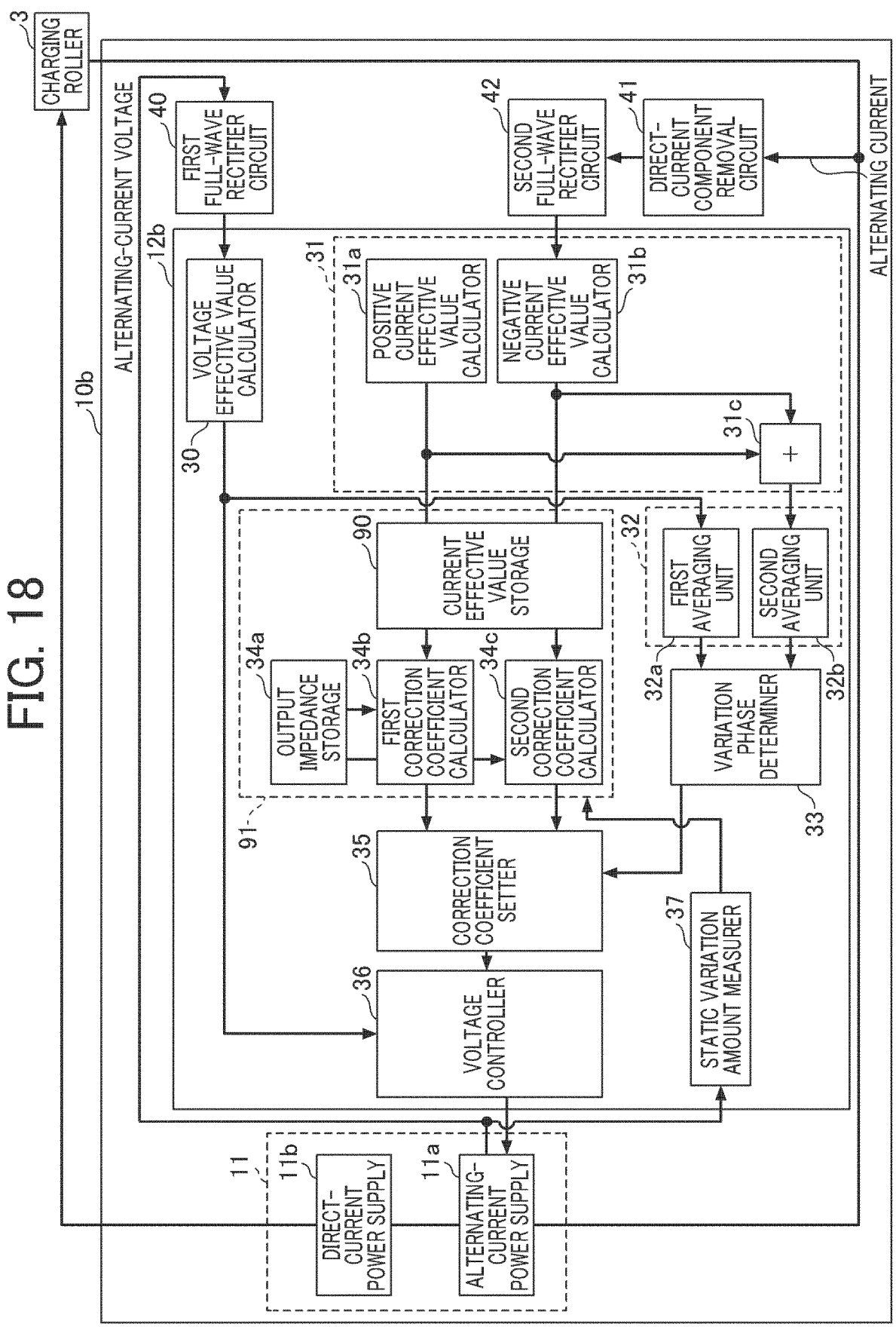
FIG. 18 is a diagram illustrating a configuration of a power controller of a fourth embodiment.

Next, an image forming apparatus according to a fourth embodiment will be described. A voltage generation device 10b included in the image forming apparatus of the fourth embodiment uses a power controller 12b having a configuration illustrated in FIG. 18 in place of the power controller 12 having the configuration illustrated in FIG. 2. The power controller 12b includes a correction coefficient calculator 91 with a current effective value storage 90, in place of a correction coefficient calculator 34. The other components are similar to the components of the first embodiment. The components similar to the components in the first embodiment are given the same reference numerals and descriptions is omitted.

The correction coefficient calculator 91 includes the current effective value storage 90 in addition to an output impedance storage 34a, a first correction coefficient calculator 34b, and a second correction coefficient calculator 34c.

The current effective value storage 90 respectively receives a positive current effective value Iprms and a negative current effective value Inrms from a positive current effective value calculator 31a and a negative current effective value calculator 31b, and stores the positive current effective value Iprms and the negative current effective value Inrms of a predetermined period, for example, one variation cycle. The current effective value storage 90 inputs the stored positive current effective value Iprms and negative current effective value Inrms of one variation cycle to the first correction coefficient calculator 34b and the second correction coefficient calculator 34c in each one variation cycle. Note that the variation cycle is a cycle of load variation, and is, for example, a rotation cycle of a charging roller 3 described above.

In the present embodiment, the first correction coefficient calculator 34b calculates a first correction coefficient $\alpha p$ on the basis of the positive current effective value Iprms input from the current effective value storage 90. The second correction coefficient calculator 34c calculates a second correction coefficient an on the basis of the negative current effective value Inrms input from the current effective value storage 90.

The positive current effective value Iprms and the negative current effective value Inrms stored in the current effective value storage 90 are appropriately updated when a variation phase changes or the like.

In the present embodiment, the current effective value storage 90 stores the positive current effective value Iprms and the negative current effective value Inrms, whereby the first correction coefficient $\alpha p$ and the second correction coefficient an can be calculated at a high speed.

Note that, as a modification of the second embodiment, a correction coefficient calculator with a current peak value storage may be applied similarly to the present embodiment. The current peak value storage stores a positive current peak value and a negative current peak value of one variation cycle, and inputs the positive current peak value and the negative current peak value to the first correction coefficient calculator 34b and the second correction coefficient calculator 34c.

Further, in the above-described embodiments, the switching circuit included in the alternating-current power supply 11a is configured as a half bridge circuit. However, an embodiment is not limited thereto, and the switching circuit may be configured as a full bridge circuit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A voltage generation device for generating a voltage in which an alternating-current voltage is superimposed on a direct-current voltage, to apply the voltage to a rotary body, the voltage generation device comprising:
    a direct-current power supply;
    an alternating-current power supply connected to the direct-current power supply;
    a variation phase determiner configured to determine whether variation of an output voltage of the alternating-current power supply and variation of an output current of the alternating-current power supply are in opposite phases; and
    a voltage controller configured to perform gain correction for the output voltage in a case where the variation of the output voltage and the variation of the output current are in opposite phases.

2. The voltage generation device according to claim 1, further comprising:
    an output impedance storage configured to store an output impedance;
    a positive current effective value calculator configured to calculate a positive current effective value from the output current;
    a negative current effective value calculator configured to calculate a negative current effective value from the output current; and
    a correction coefficient calculator configured to calculate a first correction coefficient based on the output impedance and the positive current effective value and to calculate a second correction coefficient based on the output impedance and the negative current effective value,
    wherein, when the variation of the output voltage and the variation of the output current are in opposite phases, the voltage controller performs the gain correction using the first correction coefficient in a case where the output voltage is positive and performs the gain correction using the second correction coefficient in a case where the output voltage is negative.

3. The voltage generation device according to claim 2, further comprising:
   a voltage effective value calculator configured to calculate a voltage effective value from the output voltage; and
   a current effective value calculator configured to calculate a current effective value from the output current,
   wherein the variation phase determiner determines whether the variation of the output voltage and the variation of the output current are in opposite phases.

4. The voltage generation device according to claim 3, wherein the current effective value calculator includes the positive current effective value calculator, the negative current effective value calculator, and an adder configured to add the positive current effective value and the negative current effective value to calculate the current effective value.

5. The voltage generation device according to claim 4, further comprising:
   a first averaging unit configured to average the voltage effective value output from the voltage effective value calculator in each fixed cycle to output an average voltage effective value; and
   a second averaging unit configured to average the current effective value output from the current effective value calculator in each fixed cycle to output an average current effective value,
   wherein the variation phase determiner determines that the variation of the output voltage and the variation of the output current are in opposite phases in a case where a magnitude relationship of the voltage effective value output from the voltage effective value calculator with reference to a previous output value and a magnitude relationship of the current effective value output from the current effective value calculator with reference to a previous output value are different.

6. The voltage generation device according to claim 2, wherein the voltage controller includes a reference sine wave generator to generate a reference sine wave for controlling the alternating-current power supply and a positive negative determiner to determine positive or negative of the reference sine wave generated by the reference sine wave generator, and the voltage controller performs the gain correction using the first correction coefficient in a case where the reference sine wave is positive and performs the gain correction using the second correction coefficient in a case where the reference sine wave is negative.

7. The voltage generation device according to claim 2, further comprising a current effective value storage configured to store the positive current effective value and the negative current effective value of a predetermined period and to input the positive current effective value and the negative current effective value of the predetermined period to the correction coefficient calculator.

8. The voltage generation device according to claim 1, further comprising:
   an output impedance storage configured to store an output impedance;
   a positive current peak value detector configured to detect a positive current peak value from the output current;
   a negative current peak value detector configured to detect a negative current peak value from the output current; and a correction coefficient calculator configured to calculate a first correction coefficient based on the output impedance and the positive current peak value and to calculate a second correction coefficient based on the output impedance and the negative current peak value,
   wherein, when the variation of the output voltage and the variation of the output current are in opposite phases, the voltage controller performs the gain correction using the first correction coefficient in a case where the output voltage is positive and performs the gain correction using the second correction coefficient in a case where the output voltage is negative.

9. The voltage generation device according to claim 1, wherein the alternating-current power supply includes a half bridge switching circuit or a full bridge switching circuit.

10. An image forming apparatus comprising:
    the voltage generation device according to claim 1;
    a charging roller being the rotary body to which the voltage output from the voltage generation device is applied; and
    a photoconductor disposed in proximity of the charging roller.

11. A power control device for controlling a power supply device including a direct-current power supply and an alternating-current power supply connected to the direct-current power supply, to generate a voltage in which an alternating-current voltage is superimposed on a direct-current voltage and to apply the voltage to a rotary body, the power control device comprising:
    a variation phase determiner configured to determine whether variation of an output voltage of the alternating-current power supply and variation of an output current of the alternating-current power supply are in opposite phases; and
    a voltage controller configured to perform gain correction for the output voltage in a case where the variation of the output voltage and the variation of the output current are in opposite phases.

12. A method for controlling a power supply device including a direct-current power supply and an alternating-current power supply connected to the direct-current power supply, to generate a voltage in which an alternating-current voltage is superimposed on a direct-current voltage and to apply the voltage to a rotary body, the method comprising:
    determining whether variation of an output voltage of the alternating-current power supply and variation of an output current of the alternating-current power supply are in opposite phases; and
    performing gain correction for the output voltage in a case where the variation of the output voltage and the variation of the output current are in opposite phases.

* * * * *